Jan. 19, 1937.  N. O. BRANTLY  2,067,900
KNITTING MACHINE FOR MANUFACTURE OF ELASTIC STRIPS OR PIECES
Filed Jan. 15, 1935  10 Sheets-Sheet 6
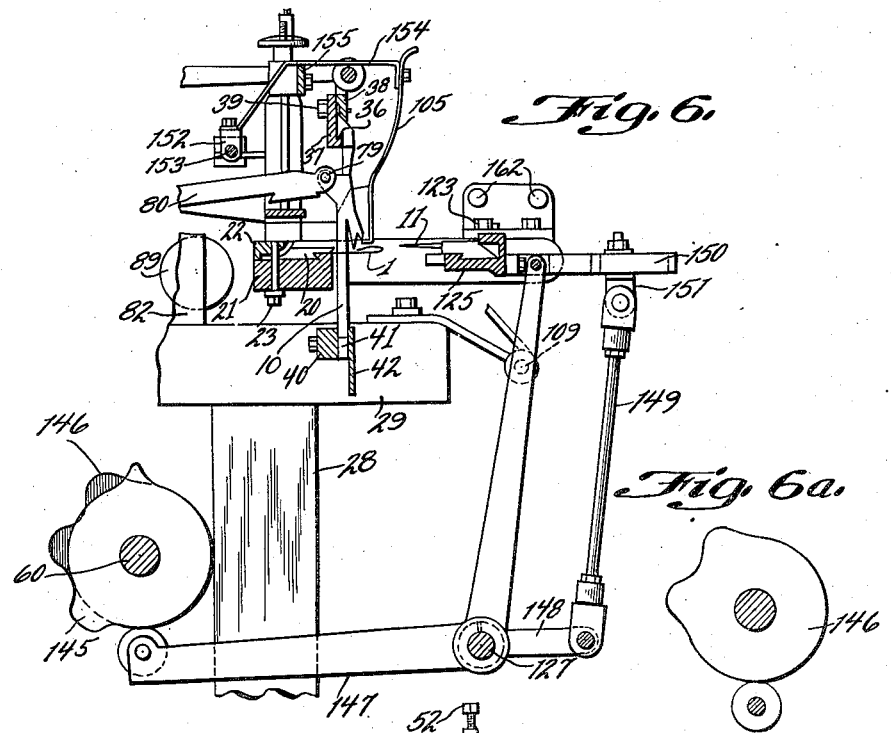
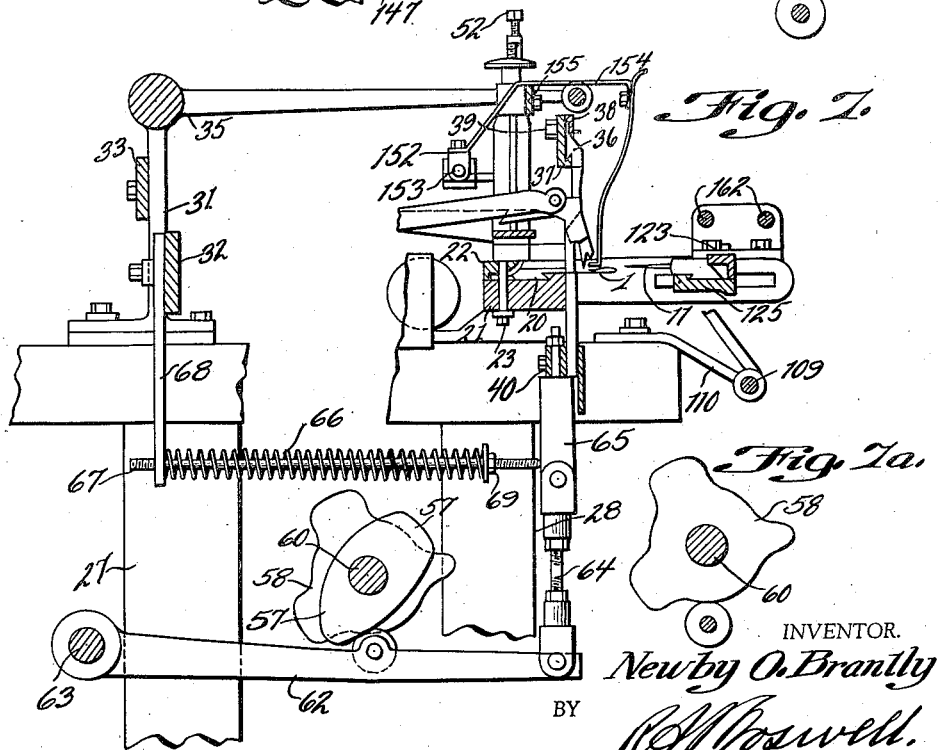
INVENTOR.
Newby O. Brantly
BY R. W. Boswell
ATTORNEY.

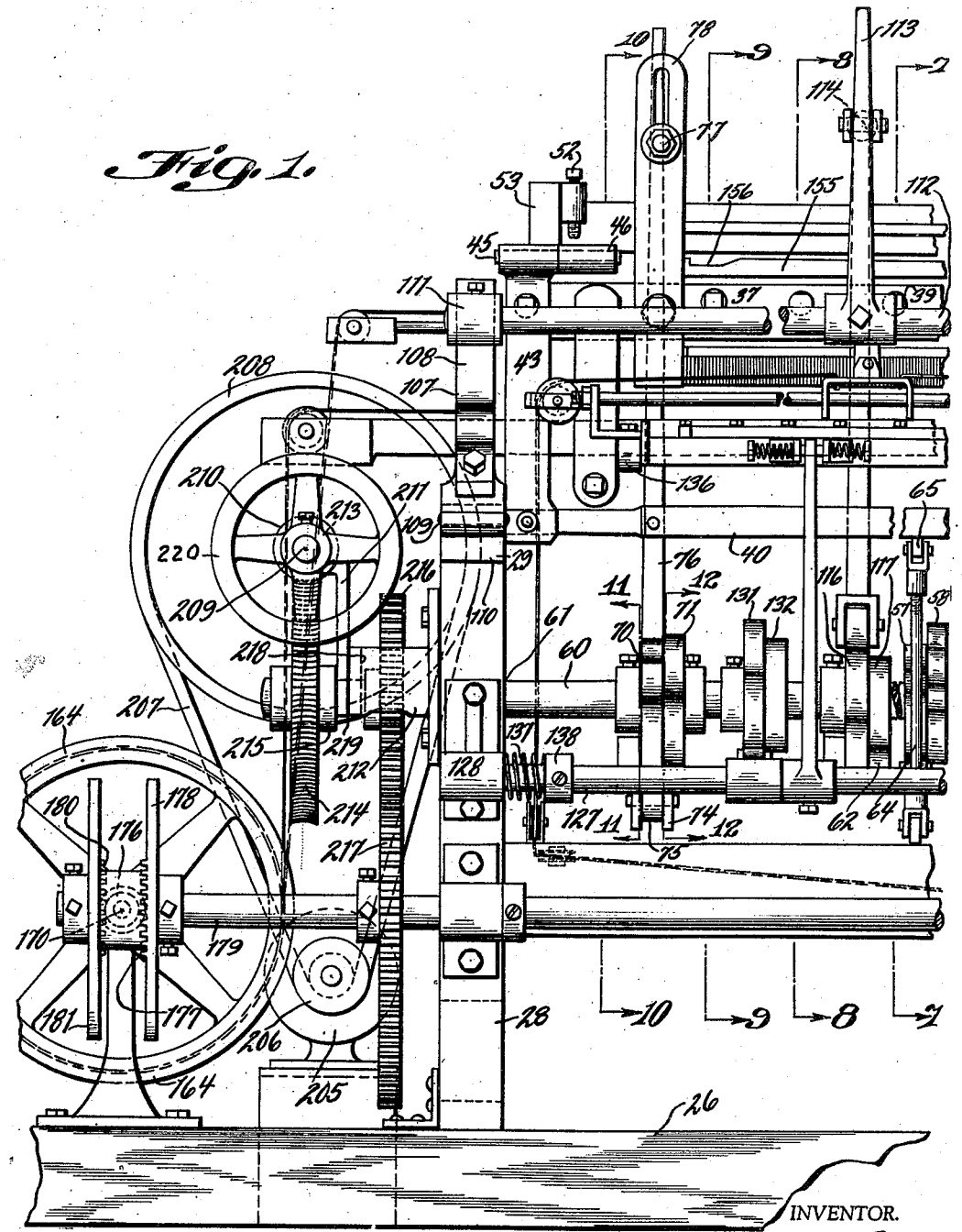

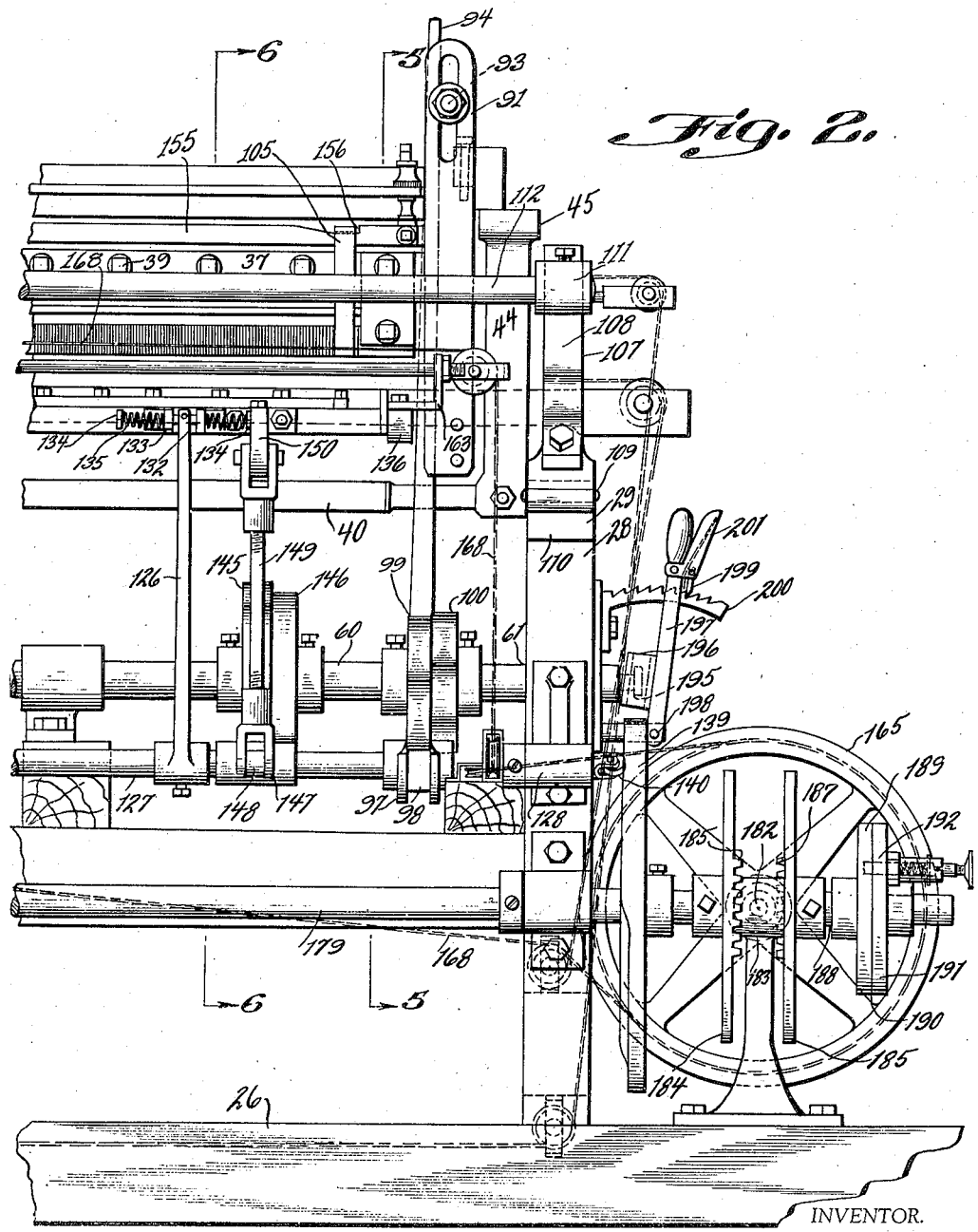

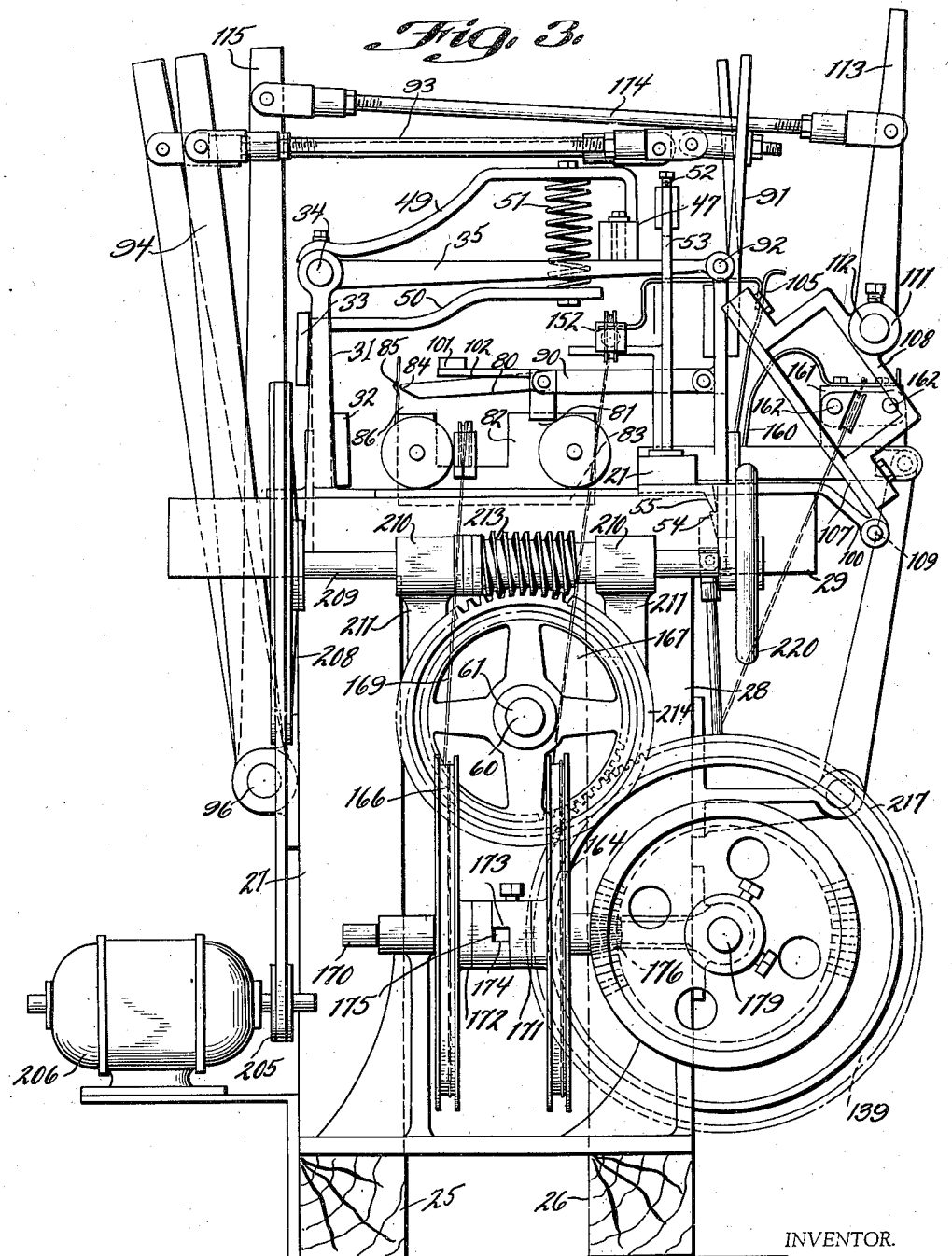

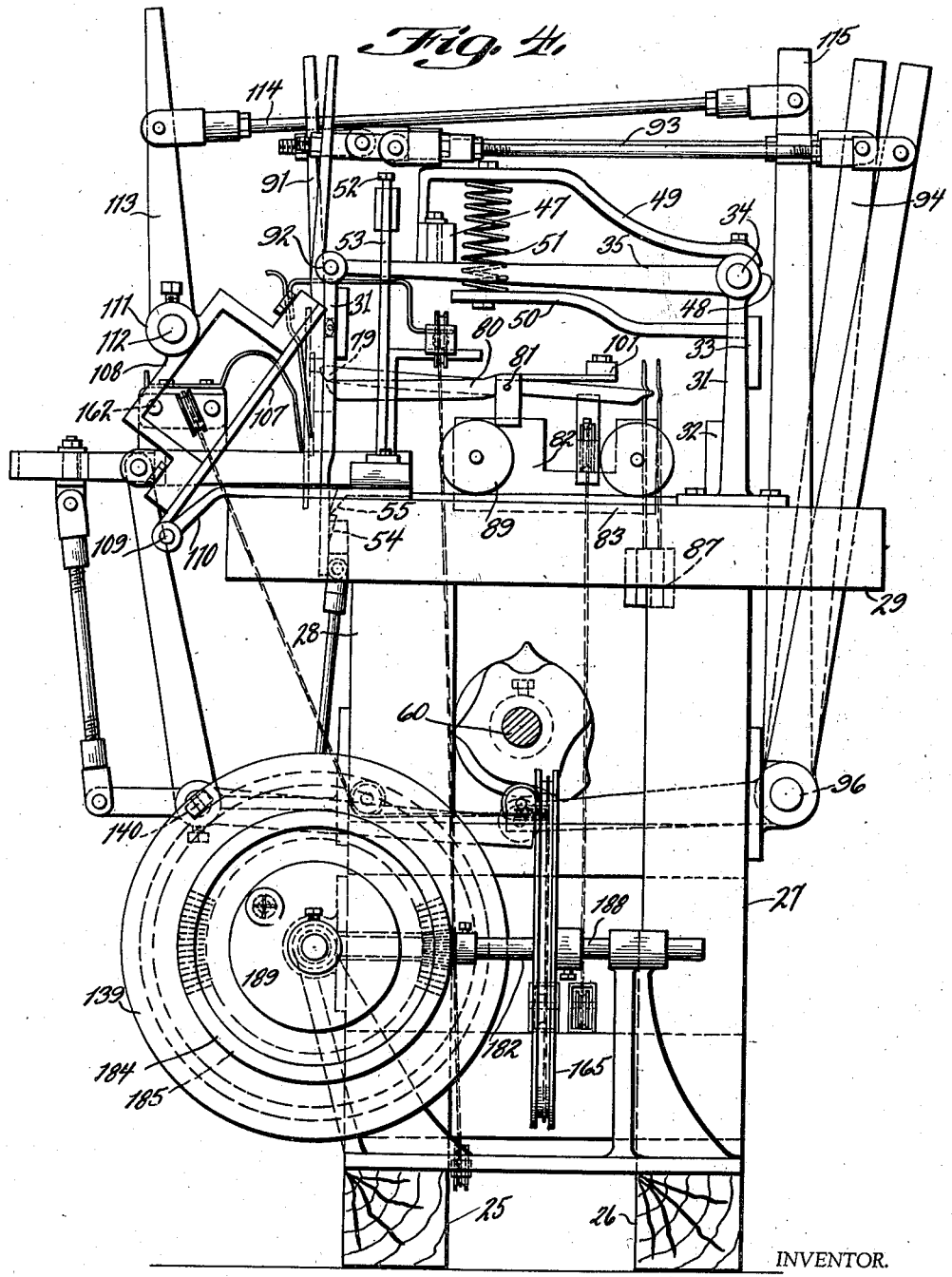

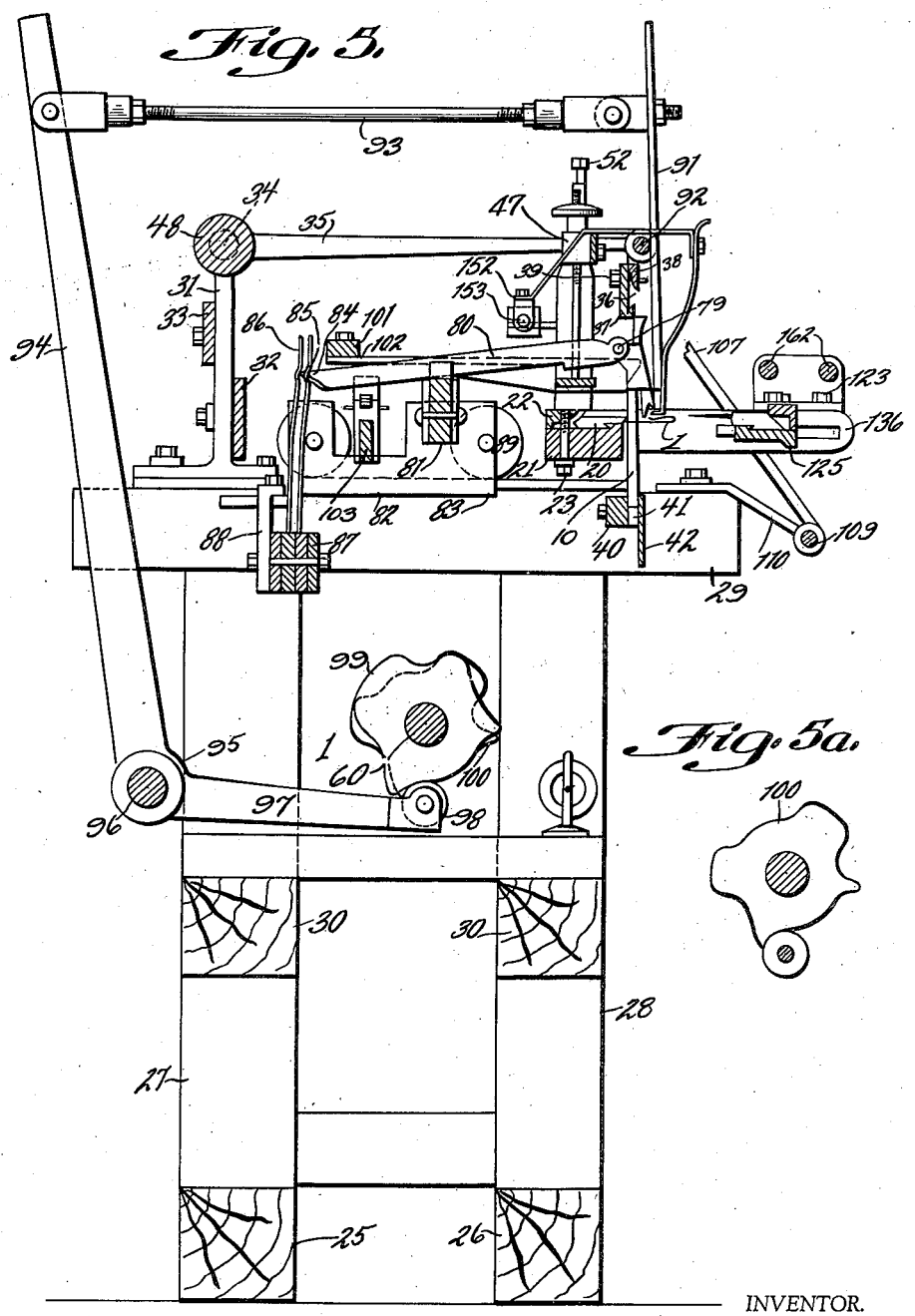

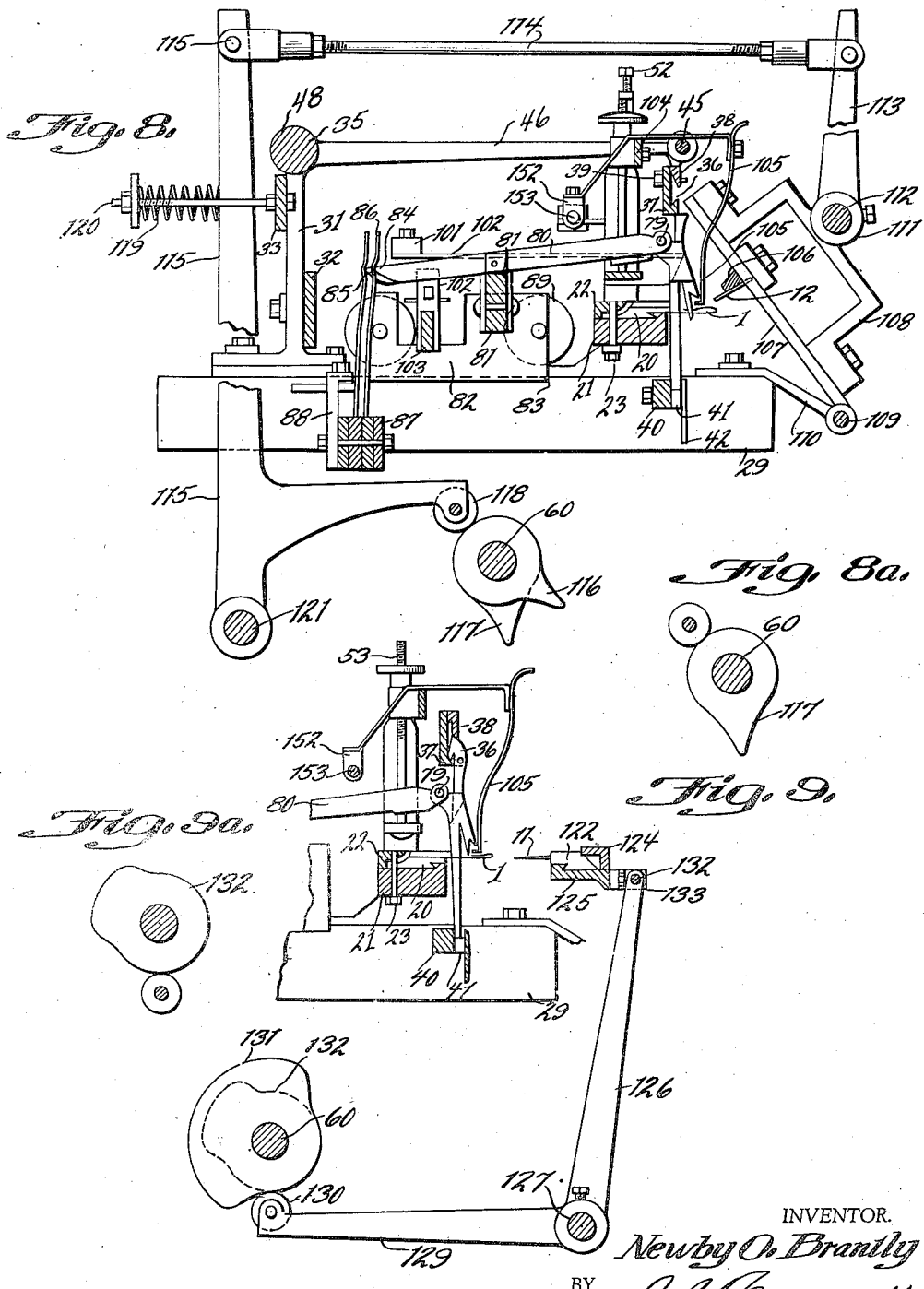

Jan. 19, 1937.　　　N. O. BRANTLY　　　2,067,900
KNITTING MACHINE FOR MANUFACTURE OF ELASTIC STRIPS OR PIECES
Filed Jan. 15, 1935　　　10 Sheets—Sheet 8
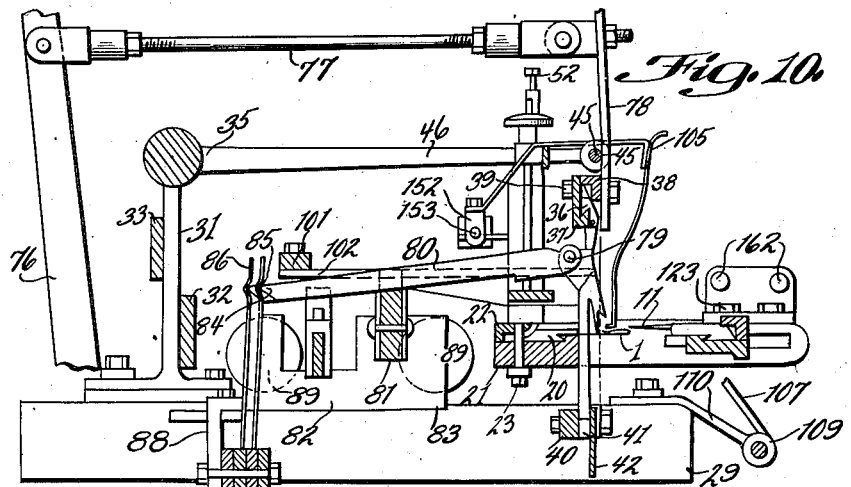
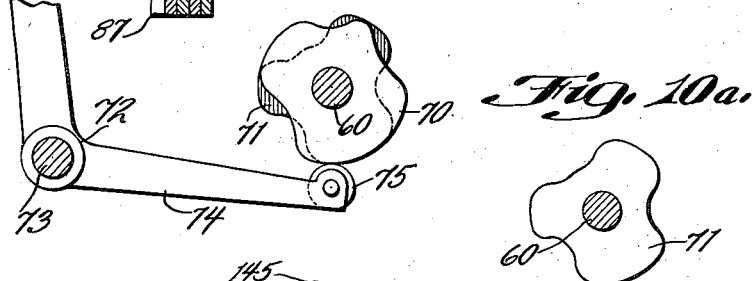
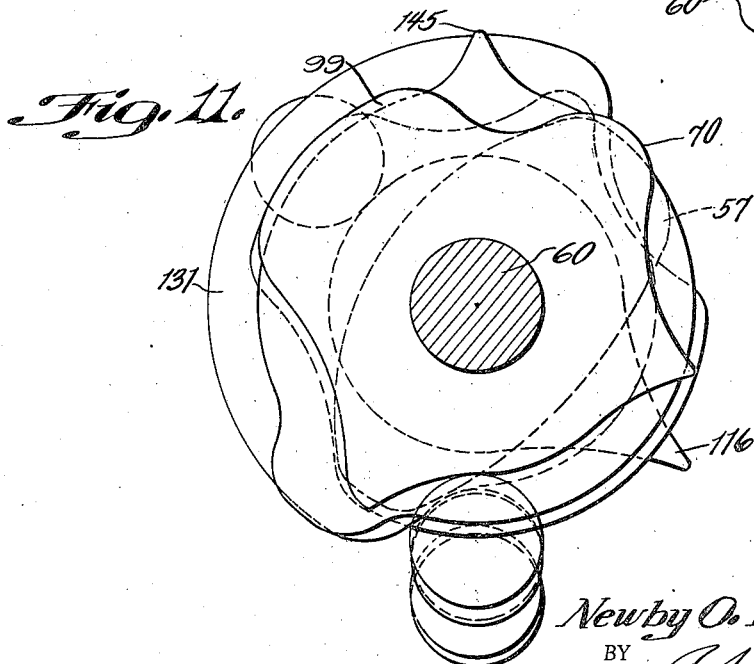
INVENTOR.
Newby O. Brantly
BY
R. C. Boswell
ATTORNEY.

Jan. 19, 1937. N. O. BRANTLY 2,067,900
KNITTING MACHINE FOR MANUFACTURE OF ELASTIC STRIPS OR PIECES
Filed Jan. 15, 1935 10 Sheets-Sheet 9

INVENTOR.
Newby O. Brantly
BY
ATTORNEY.

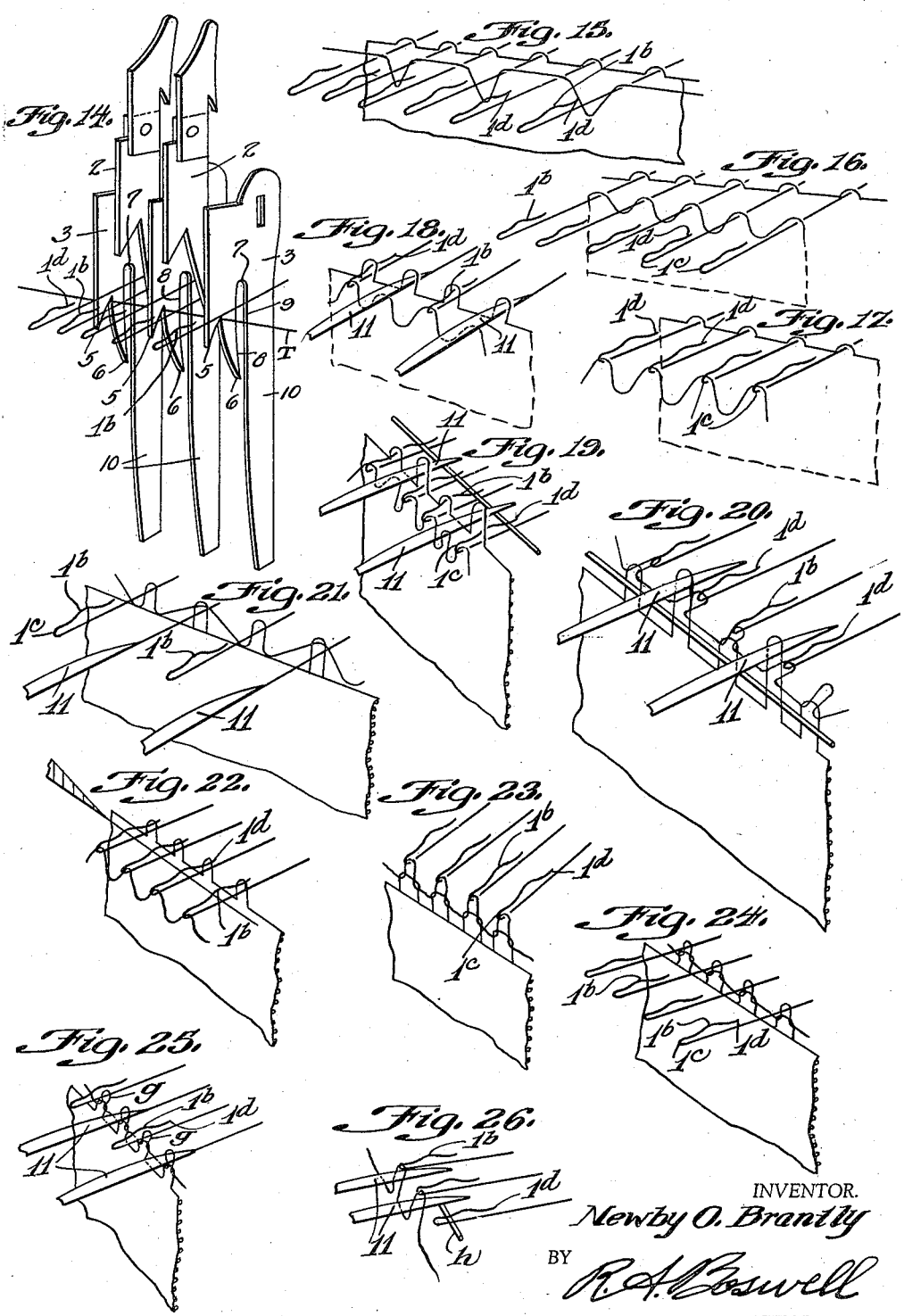

Patented Jan. 19, 1937

2,067,900

UNITED STATES PATENT OFFICE 2,067,900

KNITTING MACHINE FOR MANUFACTURE OF ELASTIC STRIPS OR PIECES

Newby O. Brantly, Philadelphia, Pa., assignor to Penn Elastic Company, Inc., Philadelphia, Pa., a corporation of Delaware Application January 15, 1935, Serial No. 1,914

5 Claims. (Cl. 66—83)

This invention relates to an improved type of knitting machine for making what is commonly referred to in the surgical fabrics art as "hand knit" i. e. rectangular or fashioned pieces or swatches of elastic fabric from which are manufactured corsets, girdles, surgical bandages, etc.

The name "hand knit" is derived from the fact that heretofore these elastic swatches have been made exclusively on hand frames wherein all the knitting and attending operations are performed manually, which is conducive of low rate of production and high cost of manufacture.

The "hand knit" swatches usually employ, throughout the body of the strip, a form of knitting known as the "Diamond" stitch, produced by tucking in alternate wales and courses, while the borders which extend coursewise along the opposite edges respectively of the strip are composed of plain stitches.

In both the body and border areas and incorporated in each or any desired number of the successively knit courses of stitches are strands of rubber, in either a bare or covered state depending upon the use to which the fabric is to be put.

The present invention concerns the general type of knitting machine and fabric above noted and the object of the present invention is to construct the machine in such a manner that the knitting and attending operations necessary to produce the fabric will each and all be performed automatically in proper sequence and in properly tuned relation one to another, whereby the machine will knit continuously without manual operations excepting the shifting of a single lever to change the knitting from the diamond stitch in the body to the plain stitch in the borders, and vice versa, at predetermined times depending upon the relative widths of the body and borders desired.

The construction of the fabric and the machine and the operation of the machine will be fully disclosed hereinafter, reference being had to the accompanying drawings wherein:

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view in front elevation of one end of the improved type of knitting machine for the manufacture of elastic strips or pieces.

Figure 2 is a view in front elevation of the opposite end of the machine, Figures 1 and 2 to be read in order to obtain a full and complete aspect of the entire machine.

Figure 3 is a view in elevation of the end of the machine shown in Figure 1.

Figure 4 is a view in elevation of the end of the machine shown in Figure 2.

Figure 5 is a vertical sectional view on line 5—5 of Figure 2.

Figure 5a is a detail view of one of the border cams shown in Figure 5.

Figure 6 is a vertical sectional view on line 6—6 of Figure 2.

Figure 6a is a view in elevation of one of the border cams shown in Figure 6.

Figure 7 is a sectional view on line 7—7 of Figure 1.

Figure 7a is a view in elevation of another of the border cams shown in Figure 7.

Figure 8 is a sectional view on line 8—8 of Figure 1.

Figure 8a is a view in elevation of another of said border cams.

Figure 9 is a vertical sectional view on line 9—9 of Figure 1.

Figure 9a is a view in elevation of still another border cam.

Figure 10 is a vertical sectional view on line 10—10 of Figure 1.

Figure 10a is a view in elevation of a border cam shown in Figure 10.

Figure 11 is a sectional view on line 11—11 of Figure 1 showing the remaining cams one behind the other.

Figure 14 is a diagrammatic perspective view showing the relationship between a series of sinkers and a series of bearded needles of the machine in the first step of forming the course of diamond stitches.

Figure 15 is a diagrammatic perspective view which shows the position of the knitting thread on the needles as a result of the action of the jack sinkers in Figure 14.

Figure 16 is a diagrammatic perspective view showing a second step in the stitch i. e. the dividing of the thread by cooperative action of the jack and the lead sinkers in Figure 14.

Figure 17 is a diagrammatic perspective view showing the third step, i. e. the movement of the divided thread under the beards of the needles.

Figure 18 is a diagrammatic perspective view showing the fourth step of the stitch i. e. the covering of alternate needles prior to laying of the elastic strand.

Figure 19 is a diagrammatic perspective view showing the fifth step i. e. the raising of the held loops and the moving of the elastic strip over the beards of the needles.

Figure 20 is a diagrammatic perspective view showing the sixth step i. e. the holding of the intermediate alternate loops during the casting of the intermediate loops.

Figure 21 is a diagrammatic perspective view showing the seventh step in the stitch i. e. the movement of the newly formed and held stitches to the beard bearing position on the needles and the retraction of the covering points for laying of the knitting thread for the next course.

Figure 22 is a diagrammatic perspective view of the first step in the formation of the stitch used in the border of the strip or piece.

Figure 23 is a diagrammatic perspective view illustrating the second step in the stitch forming the border.

Figure 24 is a diagrammatic perspective view illustrating the third step in the formation of the stitch used in the border.

Figure 25 is a diagrammatic perspective view showing the fourth step in the making of the border stitch.

Figure 26 is a diagrammatic perspective view illustrating the fifth step in constructing a stitch of the border of the strip or piece.

Figure 13:
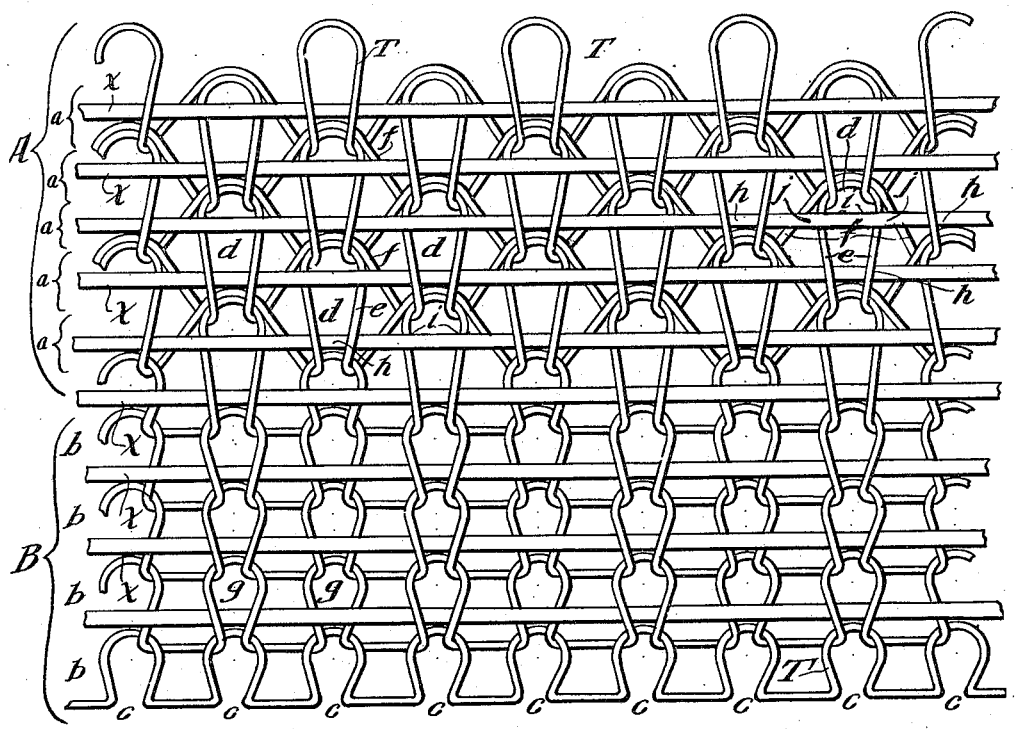
Figure 13 is a plan face view of the fabric showing the body and border stitches of the fabric.
Figure 12:
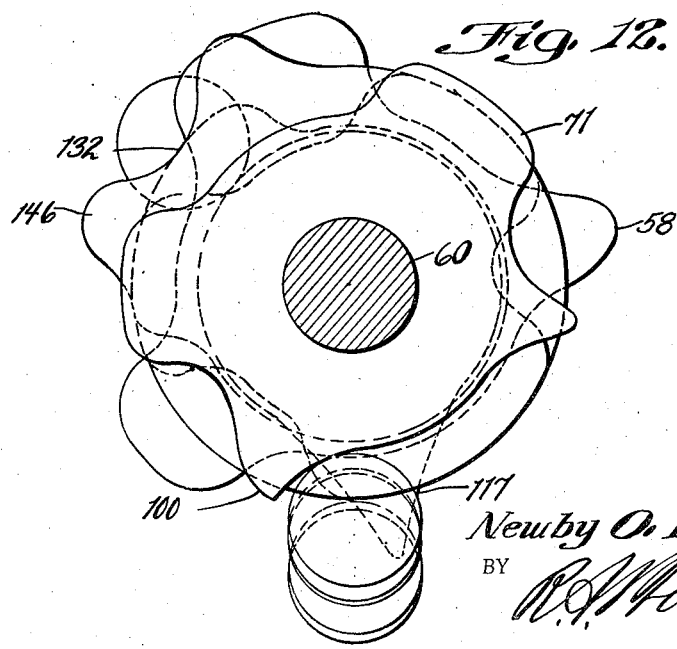
Figure 12 is a detail sectional view on line 12—12 of Figure 1 showing six of the cams one behind the other as viewed from the left hand end of the machine.

In order that the operations of the machine may be more readily understood the fabric swatch diagrammatically illustrated in Figure 13 will be first described. The swatch comprises a body A and a border B at each edge thereof in a direction coursewise of the fabric. The body A may be composed of any desired number of successive interlooped body courses $a$ and any desired number of border courses $b$, depending upon the width of the strip desired. The length of the strip or swatch may be anything desired equal to or less than the width of the full complement of needles in the machine. The number of needles employed corresponds with the number of wales $c$ in the fabric.

The body fabric A consists of a predetermined number of courses of "tuck" stitches $d$, which are formed by holding the loops $e$ of alternate wales $c$, in alternate courses $a$ and casting them with the loops $f$ of the next succeeding courses. The border B is composed of plain stitches $g$ in each course $b$ and each wale $c$.

In each course $a$ and $b$ is an elastic strand X which in the case of the courses of "tuck" stitches in the body A passes under the lower parts of the limbs of the held loop $e$ in one wale $c$ as indicated at $h$, over the top portion of the held loop $e$ in the next adjacent wale, as indicated at $i$, and under the cast loop $f$ of the tuck stitch $d$ in said next wale $c$, as indicated at $j$. In the next succeeding course this arrangement is reversed.

In the borders B the elastic strands or wefts X pass under the limbs of the loops in one wale and over the limbs of the loops in the next wale in each and all of the courses $b$, uniformly instead of in the staggered relation in the courses and wales as in the body A.

As shown in Figure 13 all the stitch loops are composed of a relatively non-elastic fibrous thread T. In forming the diamond stitches $d$ of the body A the thread T is laid across the horizontally disposed fixed needles as shown in Figure 14 and is sunk between alternate pairs of needles by jack sinkers 2, leaving the thread T on the needles in the form shown in Figure 15. Lead sinkers 3, operating between the jack sinkers 2, are then moved downwardly in the spaces between the needles not separated by jack sinkers and at the same time the jack sinkers 2 are raised slightly. This effects a dividing of the thread T uniformly between the needles, as shown in Figure 16.

The crimped thread T is then moved longitudinally outward along the shanks $1a$ of the needles and under the beards $1b$ thereof up into the points $1c$, as clearly shown in Figure 17, by the jack and lead sinkers rocking outwardly in unison with the crimped thread T held in the crotches 4 of the sinkers 2 and 3 between the short nibs 5 and long nibs 6 thereof.

During this movement of the sinkers 2 and 3, the previously formed fabric A is disposed in the throats 7 of the sinkers between the rear edges 8 of the long nibs 6 and the front edges 9 of the sinker blades 10, with loops $e$ and $f$ hanging on each of the alternate needles 1 and held loops $e$, solely, on the intermediate needles.

The sinkers 2 and 3 then rise leaving the crimped thread T hanging in the points $1c$ of the needles as clearly shown in Figure 17.

Cover points 11 then move inwardly above the intermediate needles on which the single loops $e$ are being held and then descend over the beards of these needles, closing them while a presser blade 12 moves in and downwardly and closes the beards of the alternate needles having the two loops $e$ and $f$ thereon.

The sinkers 2 and 3 then rock outwardly and move all the loops $e$, $f$ on all the needles, outwardly on the needles to a beard point clearing position as shown in Figure 18.

The presser blade 12 then recedes and the cover points 11 rise after which the elastic strand $x$ is laid on the tops of the needle beards, in front of the sinkers 2 and 3, the front edges 10 of which are then in a position outwardly beyond the points $1d$ of the needle beards $b$ so that the elastic strand will not get under the beards of the needles. The relative positions of the elastic strand, the needle beards and the cover points at this time are clearly shown in Figure 19.

The sinkers 2 and 3 then rock outwardly, casting the loops $e$, $f$, off the alternate needles and pulling a new loop $e$ through each pair of held loops $e$, $f$ and also pulling a new loop $f$ through each of the single loops $e$ then held in raised position by the cover points 11, the elastic strand X falling behind the newly formed loops $e$ on the alternate needles, where said elastic strand rests in front of the loops $e$ held on cover points 11 and lies on top of and behind the loops $f$ which were pulled through the loops $e$ on the points 11, as shown in Figure 20.

The cover points 11 then descend and again close the beards of the needles over which they are respectively positioned whereupon the fabric A is moved inwardly on the needles by backward rocking of the sinkers 2 and 3 until the loops $e$ on the points 11 are repositioned on the needles together with the new loops $f$ which were previously drawn through these same loops $e$, as clearly shown in Figure 21.

The cover points 11 then move outwardly and are shifted laterally into line with what were the intermediate needles.

The machine is then ready for the laying of the fibrous thread for the next course and the operations just described are repeated. This lateral shogging of the cover points 11 first to the right and then back again to the left for succeeding courses produces the diamond effect shown in Figure 13.

After a desired number of courses of the diamond or tuck stitches $d$ have been produced the machine is operated to produce a predetermined number of courses of plain stitches for the second border of one strip and the first border of the next strip, it being noted that the strips are formed continuously with body areas alternating with border areas after which the strips are split apart by cutting coursewise through the center of the border areas which provides a border on each of the two opposite edges of each strip.

Figure 22 illustrates the first step in the formation of the first course of plain stitches in the border area following the formation of a body area.

With a loop $e$ hanging on each of the needles and also a loop $f$ on alternate needles the fibrous thread is laid on the needles, sunk around each needle and the crimped thread moved out to the points of the needles the presser blade 12 then rocks backward and closes the beards of the needles while the fabric is moved forward on the needles until the loops $e$ and $f$ pass over the points 1d of the needle beards and rest on top of the beards 1b, whereupon the presser blade recedes and the loops $e$ and $f$ are moved out and cast over the points 1c of the needles, which draws the new loops $g$ through the loops $e$ and $f$ to form the first course of plain stitches in the border area, as shown in Figure 23.

The fabric is then moved backwardly along the needles until the newly formed loops $g$ are in the beard clearing position shown in Figure 24.

The cover points then move in and over alternate needles, then descend and close the beards of the covered needles, whereupon the fabric is moved forwardly on the needles until the alternate loops $g$ slip onto the cover points, the intermediate loops $g$ moving under the beards of the needles on which they are hanging as clearly shown in Figure 25.

The cover points then rise and lift the loops $g$ held thereon until the cover points are clear of the needle beards, whereupon the elastic thread $h$ is fed across the needles on top of the beards thereof, as clearly shown in Figure 26.

The sinkers 2 and 3 then move forward and kick the elastic thread over the points of the needles, to a position behind the loops $g$ which are held under the beards of the intermediate needles and in front of the alternate loops $g$ which are still held on the cover points 11.

The cover points then return their loops $g$ to the needles by moving outwardly as the fabric is moved inward along the needles until all the loops then on the needles are in the beard clearing position, such as that shown in Figure 24, ready for the laying of the fibrous thread T to the needles for the formation of the second course of plain stitches in the border area B.

The operations just described are repeated for each course $b$ of plain stitches in the border area B and after the desired number of courses are produced to provide a width of plain stitch fabric twice the width of a single border the operations of the machine change again to produce diamond or tuck stitches of the next body area A.

Having now fully described the construction of the fabric and the knitting operations by which the fabric is composed the following description will be devoted to the mechanism by which the above noted movements of the sinkers, cover points, thread layers and presser blade are effected.

As shown in Figures 5 to 8 inclusive the needles 1 are leaded in pairs in the usual manner and the leads 20 are secured in a cross bar 21 by a locking bar 22 through tightening screws 23.

The needle bar 21 is rigidly secured in any suitable manner to the frame of the machine which comprises lower cross beams 25 and 26 from which extend vertical end posts 27 and 28 on the top ends of which are transverse beams 29 which afford the support for the needle bar 21.

Spaced above and parallel to the cross beams 25 and 26 respectively and carried by and between the end posts 27 and 28 are cross beams 30.

Secured to the transverse beams 29 are vertical standards 31 to which are secured cross bars 32 and 33 respectively. Pivotally mounted in the upper ends of the standards 31, 31 are the trunnions 34, 34 of a horizontal U shaped frame 35, which controls the vertical movements of the sinkers, both lead and jack, under predetermined conditions.

The leads 36 of the lead sinkers 3 are mounted in a horizontal bar 37 to which they are secured by a locking bar 38 through and by bolts 39.

The lower ends of the blades 10 of the lead sinkers are mounted in a horizontal bar 40 slotted at 41 to receive the sinkers. The lower ends of the sinker blades are maintained in the slots 41 of the bar 40 by a bar 42 secured in any suitable manner to the bar 40.

The bars 37 and 40 are secured together rigidly by side bars 43 and 44, see Figures 1 and 2 respectively. These end bars 43 and 44 are pivoted at 45 to the side arms 46 of the horizontal U shaped frame 35.

The side arms 46—46 of the frame 35 are connected by a cross bar 47 and a parallel bar 48. Midway between the end arms 46, 46 is an arm 49 which is secured at its back end to the frame bar 48 and at its front end to the frame bar 47.

Secured to the fixed cross bar 31 and projecting forwardly therefrom under the swinging frame arm 49 is a fixed bracket 50 between which and the swinging frame arms 49 is a compression spring 51 which tends at all times to raise the swinging frame 35 and the sinker carrying frame composed of the bars 37, 40 and end bars 43 and 44.

Upward movement of the swinging frame 35 is limited under certain conditions by the side arms 46, 46 engaging the lower ends of limit studs 52 which are carried by vertical standards 53 which project upwardly from the needle bar 21 at opposite ends respectively thereof. Under other circumstances the upward movement of the swinging frame 35 and the sinker frame supported thereby is limited by shoulders 54 on the sinker frame engaging under hooks 55 carried by and projecting forwardly from the underside of the needle bar 21.

Vertical movements of the swinging and sinker frame against the lifting action of the spring 51 is effected during the formation of the body areas A of the fabric by cams 57 and 58, said cams 57 and 58 being secured in immediately adjacent side by side relation to each other on the main cam shaft 60 of the machine.

The main cam shaft 60 is mounted for rotary and axial sliding movement in suitable bearings 61, 61 carried by the rigid main frame of the machine.

The motion of the cams 57 and 58 is transmitted to the sinker frame by a lever 62 (see Fig. 7) which is pivoted at 63 to a suitable rigid part of the main frame of the machine. The free end of the lever 62 is connected by a link 64 to a depending lug 65 secured to the lower bar 40 of the sinker frame.

Forward rocking movement of the sinker frame is effected by a spring 66 which encircles a rod 67 the forward end of which is secured to the lug 65 of the sinker frame while its rear end is freely slidable in a strap 68 which depends from the cross bar 32. The pressure exerted by the spring 66 on the sinker frame by an adjustable abutment 69 threaded on the rod 67 increases or decreases the action of the sinker frame and the frame 35.

Rearward rocking movement of the sinker frame against the action of the spring 66 is effected during the knitting of the body areas A, by a cam 70 (see Fig. 10) in the main cam shaft 60 and during the knitting of the border areas B, by a cam 71 secured to the cam shaft 60 in immediately adjacent relation to the cam 70.

The cams 70 and 71 apply motion to the sinker frame through a bell crank lever 72 which is pivoted at 73 to a fixed part of the machine. The one arm 74 of the bell crank lever 72 carries a cam follower 75 while the second arm 76 of the bell crank lever is connected by a link 77 to a lever arm 78 which is secured to and projects vertically from and above the pivots 45 of the sinker frame.

The jack sinkers 2 are pivotally connected at their upper ends to the forward ends of jack levers 80, as indicated at 79. The jack levers 80 are mounted for rocking movement in the slots of a comb-like upper side of a cross beam 81 which is mounted at its opposite ends on end plates 82 of a carriage 83.

The rear ends of the jack levers 80 are beveled to provide relatively pointed ends 84 which are engaged by and in sockets 85 formed in the upper ends of flat vertically extending jack returning springs 86. The jack springs 86 are rigidly mounted at their lower ends in a cross beam 87 secured by brackets 88 to the end members of the main frame of the machine.

The carriage 83 is provided with traction wheels 89 which ride on the upper surfaces of the end beams 29, 29 respectively and is pivotally connected by a link 90 (see Fig. 3) to the lower end of a lever 91. The lever 91 is pivoted at 92 about the same pivot which connects the right side member 44 of the sinker frame with the right side arm 46 of the swinging frame 35.

The upper end of the lever 91 is connected by a link 93 to one arm 94 of a bell crank lever 95 which is pivoted at 96 to a fixed portion of the machine. The second arm 97 of the bell crank lever is provided with a cam follower 98 which is adapted to ride a cam 99, secured to the cam shaft 60, during the formation of the diamond stitches d of the body fabric A, or a cam 100, positioned immediately adjacent the cam 99, during the formation of the stitches g of the border fabric B.

Overlying and spaced above the rear ends of the sinker jack levers 80 is a catch or leveling bar 101 which, when the jack levers are released from the latch springs 86 engage the under side of the leveling bar 101 and retain the jack sinker 2 in coinciding relation to the lead sinkers 3.

The leveling bar 101 is rigidly secured to the rear ends of rigid arms 102 which are rigidly mounted on the backs of the end pieces 43 and 44 of the sinker frame so that when the jack levers 80 are released from the latch spring 86 the jack sinkers 2 and lead sinkers 3 move in unison.

The jack levers 80 are released from the latch springs 86, during the laying of the fibrous thread T to the needles, by a slur cock 103 which is adapted to traverse the full complement of sinker levers 80 in timed relation with the needle traversing movements of the thread layer 105.

The mechanism for effecting the needle and jack lever traversing movements of the thread guide 105 and slur cock 102 respectively will be fully disclosed hereinafter.

The slur cock 103 rides on a rail 104 which parallels the lever supporting comb 81 and like the comb 81 is supported at its opposite ends on and by the end plates 82 of the carriage 83.

The bell crank levers 76 and 94 which control the forward and rearward movements of the sinker frame and carriage respectively through the greater portion of their cycles of movement move in unison to retain the jack and lead sinkers in coinciding relation to each other at all times excepting during the last part of the cycle, at which time the lever 94 which controls the movements of the carriage 83 rocks through a slightly greater angle than the lever 76 which controls the forward and rearward rocking motions of the sinker frame, whereby the pointed ends 84 of the sinker jack levers 80 are moved into contact with the jack springs 86.

At the same time the sinker frame is lowered and with it is lowered the leveling bar 101 whereby the pointed ends 84 of the jack levers 80 are positioned in the recesses 85 of the springs 86 ready for the next traversing movement of the slur cock 102.

In order to provide clearance for the slur cock the sinker frame rises and carries the leveling bar 101 upwardly clear of and to a relatively spaced position above the jack levers 80.

The presser blade 12 extends across the full complement of needles 1 and is carried by a cross bar 106 which is secured at its opposite ends respectively to a pair of levers 107, 107 which are provided with arched members 108, 108 respectively.

The levers 107, 107 are pivoted at 109, 109 to brackets 110, 110 respectively secured to the end frame members 29, 29. Carried by and rigidly secured at its opposite ends in bearings 111, 111 on the arched members 108 of the levers 107 is a cross rod 112, intermediate the ends of which is positioned and secured a lever 113 by which the presser blade is operated through a link 114 and lever 115 from a cam 116 during the formation of the stitches d of the body fabric A or from a cam 117 during the formation of the border stitches g.

The cams 116 and 117 are secured to the main cam shaft 60 in immediately adjacent relationship to each other.

The cam follower 118 is held in contact with the cam 116 or 117 as the case may be, by a spring 119 which encircles a rod 120, one end of which is secured on the cross bar 33. The opposite end of the rod 120 is provided with an abutment for one end of the spring 119, the opposite end of which bears against the lever 115 and tends to rock it in one direction about its pivot 121, which is secured to a fixed portion of the machine.

The cover points 11 are leaded in pairs and the leads 122 thereof are rigidly secured in a floating cross bar 125 by a clamp bar 124 secured to the cross bar 125 by bolts 123.

The point bar 125 is supported and operated inwardly and outwardly relative to the needles by levers 126, which are secured to a cross shaft 127, adjacent the opposite ends of the point bar 125.

The shaft 127 is mounted for rotary and axial sliding movements in bearings 128, 128 secured respectively to the end frame members 28, 28. Secured to the shaft 127 is a lever 129 which is provided with a cam follower 130 arranged to ride on a cam 131 during the formation of the body fabric A and on a cam 132 during the formation of the border fabric B, said cams being rigidly secured to the cam shaft 60 in laterally adjacent relation to each other.

The upper ends of the levers 126 are provided with short shafts 132, 132 which are secured in the levers and project laterally from each side of each lever 126. The projecting portions of the short shafts 132 are mounted for oscillatory and axial movement in bearings 133, 133 secured to the point bar 125. Beyond the bearings 133, 133 and abutments 134, 134 formed on the opposite ends of each short shaft 132 are springs 135, 135 which operating against each other center the levers 126 between the bearings 133, 133 by sliding the bearings 133, 133 along the short shaft 132 in opposite directions which moves the point bar 125 to a neutral position with respect to the levers 126, 126.

The point bar 125 is positioned between guides 136, 136 respectively carried by the end frames of the machine. The point bar is shogged longitudinally in one direction into engagement with one of the guides 136 by a spring 137 which encircles the shaft 127 between the bearing 128 at the left side of the machine (see Fig. 1) and a collar 138 which is secured to the shaft 127 and when in this position the points 11 are aligned with alternate needles 1.

The point bar 125 is shogged in the opposite direction, to align the points 11 with the intermediate needles, by a lateral thrust disc cam 139 (see Fig. 2) which is secured to a shaft 179. A cam follower 140 which is rotatably mounted on the end of the shaft 127 rides the side face of the disc cam and gives the point shaft 127 an axial movement of approximately three needles, however, the guides 136, 136 are so set with respect to the length of the point bar 25 that the said point bar is permitted to shog only to the extent of one needle spacing. The springs 135, 135 are provided to take up the extra two needle movement of the operating cam 139, this being done so that accurate aligning of the points 11 with the needles 1 may be accomplished by delicate adjustment and setting of the guides 136, 136.

The rocking motion of the points 11 to raise and lower the points relative to the needles is provided during the formation of the body stitches, by a cam 145 (see Fig. 6) and during the formation of the border stitches by a cam 146 said cams being secured side by side on the cam shaft 60.

The motion of the cam 145 or 146, as the case may be, is transmitted to the point bar by a lever 147 which is loosely mounted on the shaft 127 and is provided with a forwardly extending arm 148 which is connected by a link 149 to a forwardly extending arm 150. The arm 150 is rigidly secured to the point bar 125 and is slotted longitudinally to provide for adjustment of the pivot block 151 of the link 149 to vary the vertical rocking motion of the points 11 relative to the needles 1 as desired.

The thread guide 105 for the fibrous thread T is carried by a block 152 which is adapted to slide and pivot on a cross rod 153 secured at its opposite ends to the standards 53, 53. The guide 105 includes a horizontally extending portion 154 which rides on the upper surface of a cross track 155 also secured at its opposite ends to the standards 53, 53. Adjacent the opposite ends of the track 155 the said track is recessed as indicated at 156, 156 in Figures 1 and 2 respectively, which, when the guide 105 passes beyond the opposite ends of the needle bank, permits the guide to drop to a position below the needles to pull the thread T down firmly in the end needles and to provide clearance for the thread guide X to the needles as will be described later.

The thread guide which lays the elastic thread or strand X to the needles is indicated at 160 in Figure 3. The guide 160 is carried by a block 161 which is slidably mounted on a pair of parallel cross rods 162, 162 supported at their opposite ends in brackets 163, 163 which are secured to the guide arms 136, 136 for the point bar 125.

The needle traversing movements of the guides 105 and 160 for the fibrous thread T and the elastic thread X respectively and the jack traversing movements of the slur cock 102 are effected by the intermittently rotatable and reversible drums 164, 165 and 166 respectively through draft wires 167, 168 and 169 respectively.

In order that the slur cock 102 will follow the thread guide 105 for the fibrous thread T at all times, regardless of the direction of the traverse movement thereof, the drums 164 and 166 are mounted on the same shaft 170 and the hubs 171 and 172 of the two drums 164 and 166 respectively are provided with shoulders 173 and 174 disposed in the same plane of rotation and spaced apart to leave an opening 175 therebetween whereby a certain amount of lost motion is provided between the movements of the two drums, which after the lost motion is taken by the shoulder 173 of the drum 164 engaging with the shoulder 174 of the drum 166, the two drums rotate in unison, whereby the thread guide 105 moves across the needles in the lead of the slur cock 102 in its corresponding movement across the jack levers 80.

In order that this relationship will be present during the reverse movements of the slur cock and thread guide the shoulders 173 and 174 are duplicated on the opposite sides of the hubs 171 and 172, circumferentially speaking.

The intermittent reverse movements of the drums 164 and 166 are effected by reason of the shaft 170, to which the drum 164 is rigidly secured, being provided with a pinion gear 176 adapted to be engaged first by a series of teeth 177 on a disc 178, which is secured to a power driven shaft 179, at one side of the pinion 176 and then by another set of teeth 180 which are carried by a second disc 181 located at the opposite side of the pinion 176 and secured to the power driven shaft 179. As the shaft 179 rotates continuously in one direction the two sets of teeth 177 and 180 engaging the teeth of the pinion 176 alternately on opposite sides of the pinion will effect rotation of the shaft 170 and the drums 164—166 first in the one direction and then in the opposite direction with a period of rest in between.

The needle traversing movements of the thread guide 160 for the elastic thread X are effected in substantially the same manner, i. e. the drum 165 is secured to a shaft 182 which has a gear pinion 183 secured thereto and disposed between a pair of discs 184 and 185 which are respectively provided with sets of teeth 186 and 187 respectively for alternate cooperation with the teeth of the pinion 183 in the same manner as above described.

In the case of the drum 165 the discs 184 and 185 are not secured directly to the drive shaft 179 but are secured to a sleeve 188 which is loosely mounted on the shaft and provided with one section 189 of a flanged coupling 190 the second half 191 of which is secured to the shaft 179. The two flanges 189—191 of the coupling 190 are arranged to be coupled or uncoupled by a spring pressed plunger 192 carried by the coupling part 191 and projecting into the coupling half 189. This means of coupling the discs 184—185 to the shaft 179 or disconnecting the said discs from said shaft is provided in order that the laying of the elastic thread may be interrupted when desired and courses of stitches formed in which no rubber is present, such for example as in forming a plain strip in between the edges of two adjacent border strips for separating the border strips one from another and to permit of the borders being hemmed to prevent ravelling of the swatches when the fabric pieces are cut apart.

In order to shift the cam shaft 60 to throw the body stitch forming cams out of action and the border stitch forming cams into action and vice versa the cam shaft 60 is circumferentially grooved at one end as indicated at 195 in Figure 2. Extending into the groove 195 is a pair of oppositely disposed fingers 196 which are carried by a lever 197. The shift lever 197 is pivotally mounted at 198 to a fixed part of the machine and is provided with a detent 199 operable in a ratchet segment 200 which is also secured to the frame of the machine whereby, by releasing the detent 199 through the hand grip control 201, the shift lever 197 may be rocked about its pivot causing the fingers 196 operating in the groove 195 to slide the cam shaft 60 in its bearings in either direction. Release of the control 201 effectively locks the shaft 60 against accidental axial movement.

Power is applied to the cam shaft 60 and to the drive shaft 179 from a motor or other prime mover 205 rigidly mounted on the frame of the machine and operatively connected through a pulley or sprocket 206 and belt or chain 207 to a pulley or sprocket 208 which is secured to a transversely extending jack shaft 209.

The jack shaft 209 is rotatably mounted in bearings 210 formed on a bracket or brackets 211 secured to or forming part of a bracket 212 which is secured to the frame of the machine.

Secured to the jack shaft 211 is a worm 213 which meshes with a worm wheel 214 splined to the cam shaft 60. On the hub 215 of the worm wheel 214 is a spur gear 216 which meshes with a second spur gear 217 which is secured to the drive shaft 179.

The bracket 212 is provided with a projection 218 which extends into a circumferential groove 219 in the hub 215 of the worm and spur wheel 214—216 so that when the cam shaft 60 is shogged axially operative relation between the several gears will not have been affected.

The jack shaft 209 is provided with a hand wheel 220 by which the machine may be turned over manually when "starting up" a new strip of fabric after a "press-off" or when making adjustments in the operating parts of the machine.

The shoulder 54 on the sinker frame is adapted to engage the hook 55 on the main frame to prevent the sinker frame from rising into engagement with the top stops 52 during one portion of the cycle of operations of the sinkers while the fibrous thread is being laid to the needles but in that portion of the cycle in which the elastic thread is being laid to the needles it is necessary to get the front nibs of the sinkers out of the path of traverse of the guide 160 for the elastic thread X which follows substantially the same path of movement as the thread guide 105 for the fibrous thread T but which in view of the heavier weight of the elastic thread requires greater clearance at the sinkers therefor at such time the sinker frame is rocked outwardly by its cam a sufficient distance to release or cause the shoulder 54 to clear the hook 55 whereupon the sinker frame lifting spring 51 raises the sinker frame until the rocker frame 35 which supports the sinker frame engages the top stops 52.

From the foregoing description it will be obvious that with the various cams properly shaped, tuned and secured in definite relation to each other on the cam shaft 60 and by applying mechanical power to said cam shaft and the drive shaft 179 the various instrumentalities of the knitting machine will be caused to cooperate one with the other in a series of interdependent movements to produce a continuous strip of fabric without attention of the operator except at times when it is desired to change from the body stitch operations of the machine to the border stitch movements of the machine at which time the operator merely shifts the cam shaft 60, or at times when plain fabric without elastic is to be formed when the operator merely releases the drum 165 to effect stopping of the elastic thread carrier 160, by pulling the plunger 192, all other operations of the machine being entirely automatic and continuous as long as power is applied to the jack shaft of the machine.

The invention having been set forth, what is claimed is:

1. The combination of a permanently fixed bank of needles, power driven means for laying a knitting thread to said needles, power operated means for sinking said thread around said needles, a series of cover points aligned with predetermined needles respectively, power driven means for operating said points to lift hanging stitches from the aligned needles, power driven means for laying an inlay thread to said needles during the holding of said lifted stitches on said points, power driven means for operating the sinkers relative to the needles to force hanging stitches from the needles not aligned with cover points, said point operating means being subsequently operated to return the lifted stitches to the needles aligned therewith, power driven means for shogging the cover points laterally a predetermined distance, means limiting the lateral movement of said points to align the points accurately with another group of needles, and means resiliently compensating for the difference between the motion of the shogging means and the lateral movement of the points.

2. The combination of a permanently fixed bank of needles, a series of jack sinkers, levers respectively supporting said jack sinkers, a series of dividing sinkers, a frame supporting the dividing sinkers and affording guides for the jack sinkers, a presser blade, cover points, a cam shaft, a pair of cams on said shaft for actuating said sinker frame longitudinally of the sinkers, a pair of cams on said shaft for rocking said sinker frame, a pair of cams on said shaft for actuating the cover points longitudinally, a pair of cams on said shaft for rocking said points, a pair of cams on said shaft for actuating said presser blade, and means for rotating said shaft under power to effect cooperative knitting action of said cam actuated elements relative to said needles, a pair of thread guides for laying different threads respectively to said needles, a slur cock for operating said jack sinkers to press one of said threads between predetermined needles of said bank, wires for effecting traversing movements of the thread guides and slur cock, actuating cables respectively connected to said thread guides and slur cock, drums respectively operating said cables, means for effecting reverse rotations of said drums, and means operatively connecting the drum driving and reversing means with said cam shaft for effecting cooperative action between the sinkers, thread guides, cover points and presser blade.

3. A knitting machine comprising a permanently fixed bank of needles, a series of sinkers, a presser, a series of cover points aligned with alternate needles, means for chogging the cover points into alignment with the intermediate needles, power driven means for feeding the thread including an inlay thread to the needles, and means to cooperatively move the sinkers, the presser and the points to incorporate the inlay thread by tuck stitches, and means resiliently compensating the difference between the motion of shogging means and the lateral movement of the points.

4. A knitting machine comprising a permanently fixed bank of needles, a series of sinkers including limiting means therefor, a presser, a series of cover points aligned with alternate needles, means for shogging the cover points into alignment with the intermediate needles, power driven means for feeding the thread including an inlay thread to the needles, and means to cooperatively move the sinkers, the presser and the points to incorporate the inlay thread by tuck stitches, and means resiliently compensating the difference between the motion of shogging means and the lateral movement of the points, and means for releasing said sinkers from its limiting means preparatory to laying certain of the threads to said needles.

5. A knitting machine comprising a permanently fixed bank of needles, a series of sinkers, a presser, a series of cover points aligned with alternate needles, means for shogging the cover points into alignment with the intermediate needles, power driven means for feeding the thread, including an inlay thread, to the needles, and power driven means to cooperatively move the sinkers, the presser, and the points, both power driven means being periodically interassociated and cooperative so that the periodicities of operation of both power driven means may be at such intervals as may insure unison of timed movement between the feeding of said thread and the inlay thread and the movement of the sinkers, the presser, and the points, whereby the inlay thread, may by tuck stitches, be incorporated.

NEWBY O. BRANTLY.